United States Patent [19]
Mathys

[11] 3,781,917
[45] Jan. 1, 1974

[54] HIP JOINT PROSTHESIS

[76] Inventor: Robert Mathys, Guterstrasse 5, Bettlach, Switzerland

[22] Filed: Oct. 12, 1971

[21] Appl. No.: 187,964

[30] Foreign Application Priority Data
Oct. 13, 1970 Switzerland.................... 15079/70

[52] U.S. Cl. .................................. 3/1, 128/92 CA
[51] Int. Cl. .............................................. A61f 1/24
[58] Field of Search................. 3/1; 128/92 R, 92 C, 128/92 CA, 92 G

[56] References Cited
UNITED STATES PATENTS

| | | | |
|---|---|---|---|
| 2,719,522 | 10/1955 | Hudack .......................... | 128/92 CA |
| 2,679,245 | 5/1954 | Timmermans................... | 128/92 CA |
| 2,668,531 | 2/1954 | Haboush ........................ | 128/92 CA |
| 3,486,500 | 12/1969 | Ball et al........................... | 128/92 R |

FOREIGN PATENTS OR APPLICATIONS

| | | | |
|---|---|---|---|
| 1,491,246 | 5/1969 | Germany........................ | 128/92 CA |

OTHER PUBLICATIONS

Vitallium Advertisement, Page 4, by Austenal Laboratories, Inc., The Journal of Bone & Joint Surgery, Jan. 1952, Fig. B, McBride Type, (Door Knob) Hip relied upon.

*Primary Examiner*—William E. Kamm
*Assistant Examiner*—Ronald L. Frinks
*Attorney*—Werner W. Kleeman

[57] ABSTRACT

A hip joint prosthesis of the type incorporating a ball head, a curved shaft intended to be inserted into the femur, and a support collar located between the shaft and the ball head. A screw hole is provided at the side of the support collar located at the outside curvature of the curved shaft for the purpose of anchoring the prosthesis by means of a screw at the outer corticalis.

4 Claims, 1 Drawing Figure

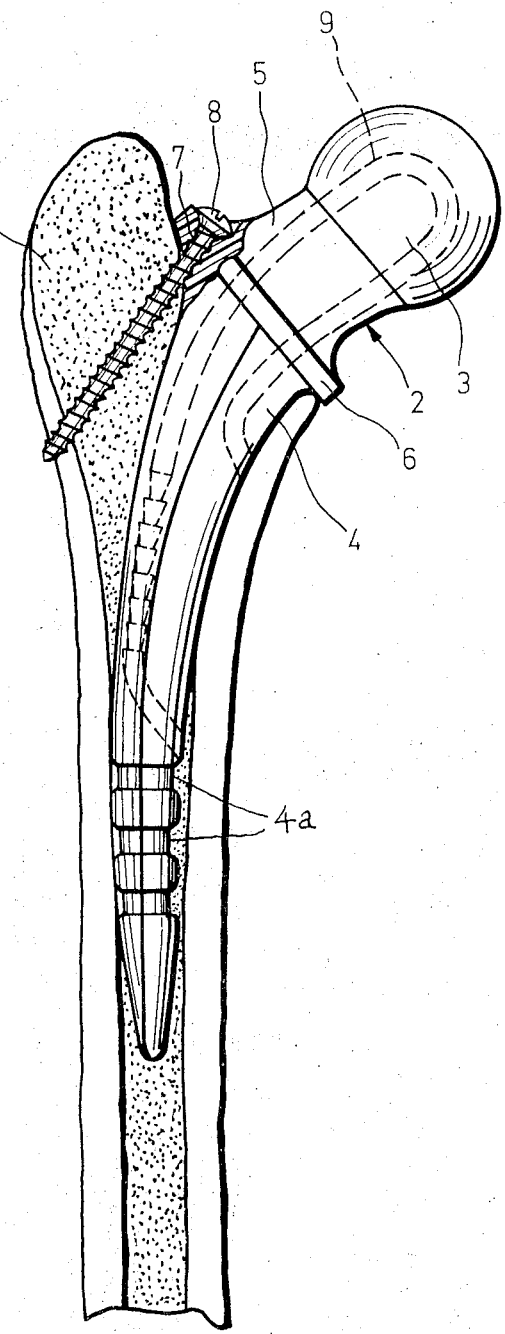

HIP JOINT PROSTHESIS

BACKGROUND OF THE INVENTION

The present invention relates to a new and improved hip joint prosthesis incorporating a ball head, a curved shaft inserted into the femur, and a support collar located between this shaft and the ball head.

Artificial hip joint prosthesis of this general type are not only known to the art but have been used quite extensively, even though they are associated with certain drawbacks. One of these drawbacks resides in the fact that such type prior art prosthesis must be attached with bone cement since, up to now, no possibility has been recognized for otherwise permanetly connecting such with the femur. This is so even though the use of screws has been known for quite some time in bone or osteopathic surgery.

SUMMARY OF THE INVENTION

Therefore, from what has been discussed above it will be recognized that a real need still exists in the art for an artificial hip joint prosthesis which is not associated with the aforementioned drawbacks of the prior art constructions. Hence, a primary object of the present invention is to provide a new and improved hip joint prosthesis which is not associated with the aforementioned drawbacks and effectively and reliably fulfills the existing need in the art.

Another and more specific object of the present invention is to provide a new and improved hip joint prosthesis which is constructed in such a manner that it can be anchored at least for such length of time at the bone until the bone has grown together with the prosthetic shaft and without having to resort to the technique of imbedding such prosthesis by means of bone cement at the bone.

Now in order to implement these and still further objects of the present invention, which will become more readily apparent as the description proceeds, it is contemplated to provide the support collar which is located at the side of the curved prosthetic shaft possessing the outer or external curvature with a screw hole in order to be able to anchor the prosthesis by means of a screw at the outer corticalis. By virtue of these measures it is not only possible to dispense with the use of bone cement but, furthermore, there is additionally afforded the advantage that there can be realized an advantageous alteration of the mechanical conditions. Whereas the lower end of the prior art rigid prosthetic shaft was required to take up the entire bending forces, now it is possible to distribute the transmission of the load over the entire length of the shaft. Thus, the screw can be introduced from above, that is, from the side of the ball head through the screw hole, screwed into the bone and anchored at that location. Yet, it is also however possible to provide the screw hole or bore with threading and to thread the screw from below into such threading, and in order to increase the support or contact surface of the screw head advantageously provide a washer or support disc.

Even though at least the shaft can be formed of metal, a further improvement of the invention can be realized if at least the prosthetic shaft is formed of plastic, the elasticity of which corresponds approximately to the elasticity of a bone. Although those versed in the art were previously of the opinion that the shafts of such prosthesis must be formed of metal in order to obtain sufficient stability, it has been found that contrary to this opinion a shaft formed of a suitable plastic provides the advantage that now one is capable of not only maintaining the biomechanical characteristics of a bone, but also it is possible to prevent any type of damage to the bone cells which leads to destruction of the bone. A prosthesis which has its shaft or which itself is formed or a suitable plastic grows together with the bone into a unitary structure.

In order to accelerate such growth and thus to improve the adherence it is advantageous to design the shaft so that it is not smooth, for instance, as would be obtained by polishing, rather to provide such with anchoring notches or the like formed as recesses or grooves. In the event that the prosthesis is formed of plastic, then, it can be advantageous to reinforce such with a metal reinforcmeent, since in so doing it is possible to regulate the elasticity so as to correspond to the elasticity of the bone.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE illustrates a front view of preferred embodiment of hip joint prosthesis or artificial limb as such has been inserted into the upper thigh bone.

DETAILED DESCRIPTION OF THE PREFERRED EMBODIMENTS OF THE INVENTION

Considering now the drawing it is to be understood that reference numeral 1 designates the upper portion of an upper thigh bone, commonly known as the femur, having the femur head missing. There is shown inserted into this femur a hip joint prosthesis or artificial limb, designated in its entirety by reference character 2. This hip joint prosthesis 2 possesses a spherical or ball head 3 and a curved shaft 4. This curved shaft 4 can be equipped with anchoring notches 4a in the form of grooves or recesses. A neck 5 merges with the ball head 3. A support collar 6 is located between this neck 5 and the shaft 4.

Support collar 6 is provided with a screw bore or hole 7 at the side located at the outside or external curvature of the shaft 4, this screw hole 7 serving to receive therethrough a screw 8 by means of which the collar 6 can be anchored at the outer corticalis. It would of course be possible to also provide this hole 7 with internal threading and to screw-in the screw 8 from the other side, in which case then a support plate or washer can be placed beneath the screw head. This has the advantage that the force engages completely at the outside. Further, the illustrated hip joint prosthesis or artificial limb 2 of this invention is here shown equipped with a reinforcement 9 which may be formed of metal and provided for the reasons previously explained.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A hip joint prosthesis comprising a ball head and a curved shaft intended to be inserted in the femur, a support collar located between said shaft and ball head, said support collar extending radially outwardly of said shaft and being provided with a screw hole at the side thereof located at the region of the external curvature of said curved shaft for anchoring said support collar by means of a screw in the outer corticalis, said hole having a longitudinal axis extending generally tangentially to the external curvature of said curved shaft, and wherein at least said shaft is formed of plastic and is provided with a metallic reinforcement.

2. The hip joint prosthesis as defined in claim 1, wherein said screw hole is provided with threading.

3. The hip joint prosthesis as defined in claim 1, wherein said prosthesis is formed of plastic.

4. The hip joint prosthesis as defined in claim 1, wherein said shaft is provided with anchoring notches constructed as recess means.

* * * * *